(12) United States Patent
Yamashita

(10) Patent No.: US 7,331,417 B2
(45) Date of Patent: Feb. 19, 2008

(54) VEHICLE BODY FRAME STRUCTURE

(75) Inventor: Akihiro Yamashita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 408 days.

(21) Appl. No.: 10/998,542

(22) Filed: Nov. 30, 2004

(65) Prior Publication Data

US 2005/0115758 A1 Jun. 2, 2005

(30) Foreign Application Priority Data

Dec. 1, 2003 (JP) ............................ 2003-402298

(51) Int. Cl.
*B60D 21/00* (2006.01)
*B60J 9/00* (2006.01)

(52) U.S. Cl. .................. 180/311; 280/781; 280/798; 280/797; 296/1.03

(58) Field of Classification Search ............... 280/781, 280/785, 797, 798, 782, 783; 180/311, 312; 296/63, 65.13, 65.14, 1.03, 205, 203.02; 248/429, 430
See application file for complete search history.

(56) References Cited

U.S. PATENT DOCUMENTS

| | | | | |
|---|---|---|---|---|
| 4,152,012 A | * | 5/1979 | Reidelbach et al. | 280/784 |
| 4,899,843 A | * | 2/1990 | Takano et al. | 180/312 |
| 6,408,515 B1 | * | 6/2002 | Durand | 29/897.2 |
| 6,557,930 B1 | * | 5/2003 | Bruggemann et al. | 296/205 |
| 6,893,078 B2 | * | 5/2005 | Saeki | 296/187.09 |

FOREIGN PATENT DOCUMENTS

| | | |
|---|---|---|
| JP | 10/067368 A | 3/1998 |
| JP | 2000-33894 | 2/2000 |
| JP | 2002-021553 A | 1/2002 |

* cited by examiner

*Primary Examiner*—Paul N. Dickson
*Assistant Examiner*—Joselynn Y. Sliteris
(74) *Attorney, Agent, or Firm*—Westerman, Hattori, Daniels & Adrian, LLP.

(57) ABSTRACT

A frame structure for a vehicle body frame includes a first and second hollow member, wherein a plate thickness of the second hollow member is greater than the plate thickness of the first hollow member. A heavy body is supported on a side of the first hollow member.

17 Claims, 5 Drawing Sheets

VEHICLE BODY FRAME STRUCTURE

FIELD OF THE INVENTION

The present invention relates to a vehicle body frame structure having a left-right pair of hollow members which is provided in, for example, a saddle ride type vehicle such as a four-wheel buggy car. In particular, the invention relates to a vehicle body frame structure in which vibration modes in the left and right hollow members are set approximate to each other in the case where a heavy body such as a muffler is supported on either one of the left and right sides of a vehicle body frame.

BACKGROUND OF THE INVENTION

A vehicle body frame in a saddle ride type vehicle, such as a four-wheel buggy car, generally includes a main frame and a rear frame composed of a left-right pair of pipe members. The main frame on the vehicle body front side typically supports an engine and the rear frame typically includes seat rails for supporting a seat on the rear side of the main frame. Japanese Patent Laid-open No. 2000-33894 discloses such an apparatus.

In the above-mentioned vehicle body frame structure, often a heavy body, such as an exhaust muffler, a battery, etc., is supported on the side of either one of the left-right pair of rear frames. Supporting such a heavy body may generate resonance between the left-right pair of pipe members, because the vibration modes in the left and right rear frames are different.

In order to minimize or prevent the resonance from being generated, it may be contemplated to adopt a structure in which the left and right pipe members are different in diametric size so that they have a different modulus of section.

When such a structure is adopted, however, it is important not to spoil the appearance quality. Further, in the case of assembling the rear frames by thus using the pipe members with different diametric sizes on the left and right sides, the mount portions of mount component parts or connection component parts are different between the left and right sides. As a result, the assembly process is likely to be complicated.

Thus, there is a need in the industry to provide a vehicle body frame structure which minimizes or prevents the generation of resonance, while maintaining the appearance quality of the structure and enhancing the design for assembly of the structure.

SUMMARY OF THE INVENTION

It is an object of the invention to minimize or prevent the generation of resonance.

It is an object of the invention to maintain the appearance quality of the structure.

It is an object of the invention to enhance the design for assembly of the structure.

In order to solve the above problems, the invention is characterized in that, in a vehicle body frame having a left-right pair of hollow members, a heavy body is supported on the side of either one of the left-right pair of hollow members, and the plate thickness of the hollow member on the side where the heavy body is supported is smaller than the plate thickness of the hollow member on the other side.

The invention is further characterized in that the left-right pair of hollow members consists of a left-right pair of angular pipes.

The invention is further characterized in that the heavy body is an exhaust muffler or a battery, and the left-right pair of hollow members differing in plate thickness are seat rails for supporting the seat.

The invention as set forth is further characterized in that a ratio of the plate thickness of the left-right pair of hollow members is 1:1.25.

The invention is further characterized in that the outer diameter of the left-right pair of hollow members is substantially the same.

The invention is further characterized in that the hollow member on either one of the left and right sides, of the hollow members differing in plate thickness between the left and right sides, is provided with a mis-assembly preventive indicator for discrimination thereof from the hollow member on the other side.

In order to solve the above-mentioned problems associated with conventional designs, the invention details a method for reducing vibration on a vehicle body frame comprising regulating a plate thickness of a left-right pair of seat rails, discriminating a first seat rail from a second seat rail, and selectively attaching a heavy body to the first seat rail that has a larger internal diameter than the second seat rail.

The method for reducing vibration on a vehicle body frame is further characterized in that regulating a plate thickness of the left-right pair of seat rails such that each seat rail has a different plate thickness.

The method for reducing vibration on a vehicle body frame is further characterized in that in that discriminating the first seat rail from the second seat rail is accomplished according to a mis-assembly preventive indicator.

The method for reducing vibration on a vehicle body frame is further characterized in that the weight of the first seat rail with the larger internal diameter is less than the weight of the second seat rail.

According to the invention, the left and right hollow members which constitute the vehicle body frame and on either one of the left and right sides of which the heavy body is supported are different from each other in plate thickness, and the plate thickness of the hollow member on the side where the heavy body is not supported is greater than the plate thickness of the hollow member on the side where the heavy body is supported, so that an imbalance of resonance frequency between the left and right sides can be eliminated, and local generation of large resonance can be prevented. Moreover, with the plate thickness made different between the left and right sides, the outside diameter (or outer sizes) of the left and right hollow members can be equalized, so that good appearance quality can be maintained, and the assembly process can be enhanced.

According to the invention, the left-right pair of hollow members consists, respectively, of a pair of angular pipes, so that good appearance can be maintained.

According to the invention, the left and right hollow members constituting the vehicle body frame are a left-right pair of seat rails, and the heavy body is an exhaust muffler or a battery, so that this structure can be easily applied to a conventional general vehicle body structure.

According to the invention, a ratio of the plate thickness of the left-right pair of hollow members is 1:1.25, so that local generation of large resonance can be minimized or prevented, good appearance quality can be maintained, and the assembly process can be enhanced.

According to the invention, the outer diameter of a left-right pair of hollow members is substantially the same, so that this structure can be easily applied to a conventional general vehicle body structure and good appearance quality can be maintained.

According to the invention, the hollow member on either one of the left and right sides, of the pair of hollow members, is provided with a mis-assembly preventive indicator, so that even if the left and right hollow members cannot easily be discriminated from each other on an appearance basis, it is possible to easily and securely discriminate the left and right members from each other and thereby to prevent mis-assembly, so that the assembly process is further enhanced.

According to the invention, the method of regulating a plate thickness of a left-right pair of seat rails, discriminating a first seat rail from a second seat rail, and selectively attaching a heavy body to the first seat rail that has a larger internal diameter than the second seat rail, minimizes or eliminates the generation of resonance. Moreover, good appearance quality can be maintained.

According to the invention, the method of regulating a plate thickness of the left-right pair of seat rails such that each seat rail has a different plate thickness is performed so that local generation of large resonance can be minimized or prevented and good appearance quality can be maintained.

According to the invention, the method of discriminating the first seat rail from the second seat rail according to a mis-assembly preventive indicator is performed so that the assembly can be enhanced.

According to the invention, the weight of the first seat rail with the larger internal diameter is less than the weight of the second seat rail, so that the generation of resonance can be minimized or eliminated.

Now, one embodiment of the present invention as applied to a four-wheel buggy car will be described below. Incidentally, in the present application, the terms front and rear, left and right, and upper and lower are used on the basis of the vehicle body in the condition where the vehicle is running forwards.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
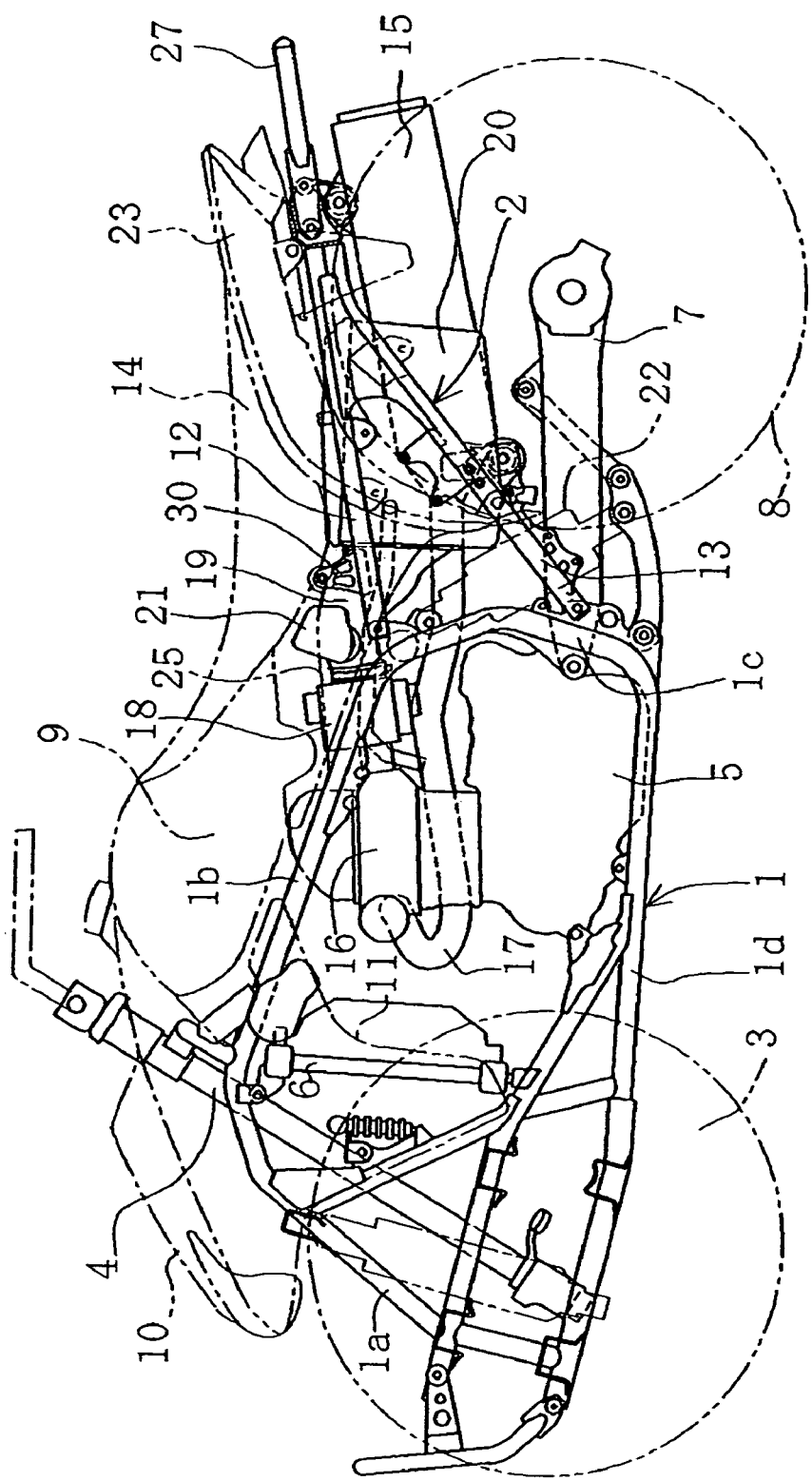
FIG. 1 is a side view of a four-wheel buggy car.

FIG. 1 is a side view of a four-wheel buggy car, in which a vehicle body frame has a main frame 1 roughly in a closed loop form in side view, and rear frames 2 extending rearward therefrom in a truss structure which is roughly triangular in side view.

The main frame 1 is composed of pipe members made of an appropriate metal such as a light alloy, and includes front pipes 1a, upper pipes 1b, pivot pipes 1c, and lower pipes 1d. Front wheels 3 are supported respectively on left and right portions of a front portion of the main frame 1, and are steered by a steering shaft 4 disposed in an offset vertical direction. An engine 5 is supported on the rear portion side of the main frame 1, and a radiator 6 is supported on the front side of the engine 5.

A front end portion of a rear swing arm 7 is swingably supported on the pivot pipes 1c located on the rear side of the engine 5 and disposed in the vertical direction, and a left-right pair of rear wheels 8 are supported at rear end portions of the rear swing arm 7. On the upper side of the engine 5, a fuel tank 9 is supported on the upper pipes 1b. A front portion of the vehicle body is covered by a front cowl 10 and a front fender 11.

The rear frames 2 include seat rails 12 extending upwardly rearward from rear end upper portions of the upper pipes 1b, and rear stays 13 extending upwardly rearward from lower portions of the pivot pipes 1c and connected to rear portions of the seat rails 12. The seat rails 12 and the rear stays 13 are pipe members made of the same material as the material of the main frame 1. A seat 14 is supported on the seat rails 12. In addition, an exhaust muffler 15 is disposed on one side of the vehicle body (in this embodiment, on the right side of the vehicle body) while overlapping with the rear wheels 8 in side view, and is supported by the seat rail 12.

The rear end of an exhaust pipe 17 is connected to the front end of the muffler 15. The exhaust pipe 17 extends forwards from an exhaust port provided at a front surface of a cylinder head 16 of the engine 5, then extends via a lateral side of the engine 5, and extends rearward. An intake port is provided at a rear surface of the cylinder head 16, and a carburetor 18 is connected thereto. The carburetor 18 sucks clean air from an air cleaner 20 provided on the rear side through a connecting tube 19. Symbol 21 denotes a silencing chamber, 22 denotes a rear cushion, and 23 denotes a rear fender.

Figure 2:
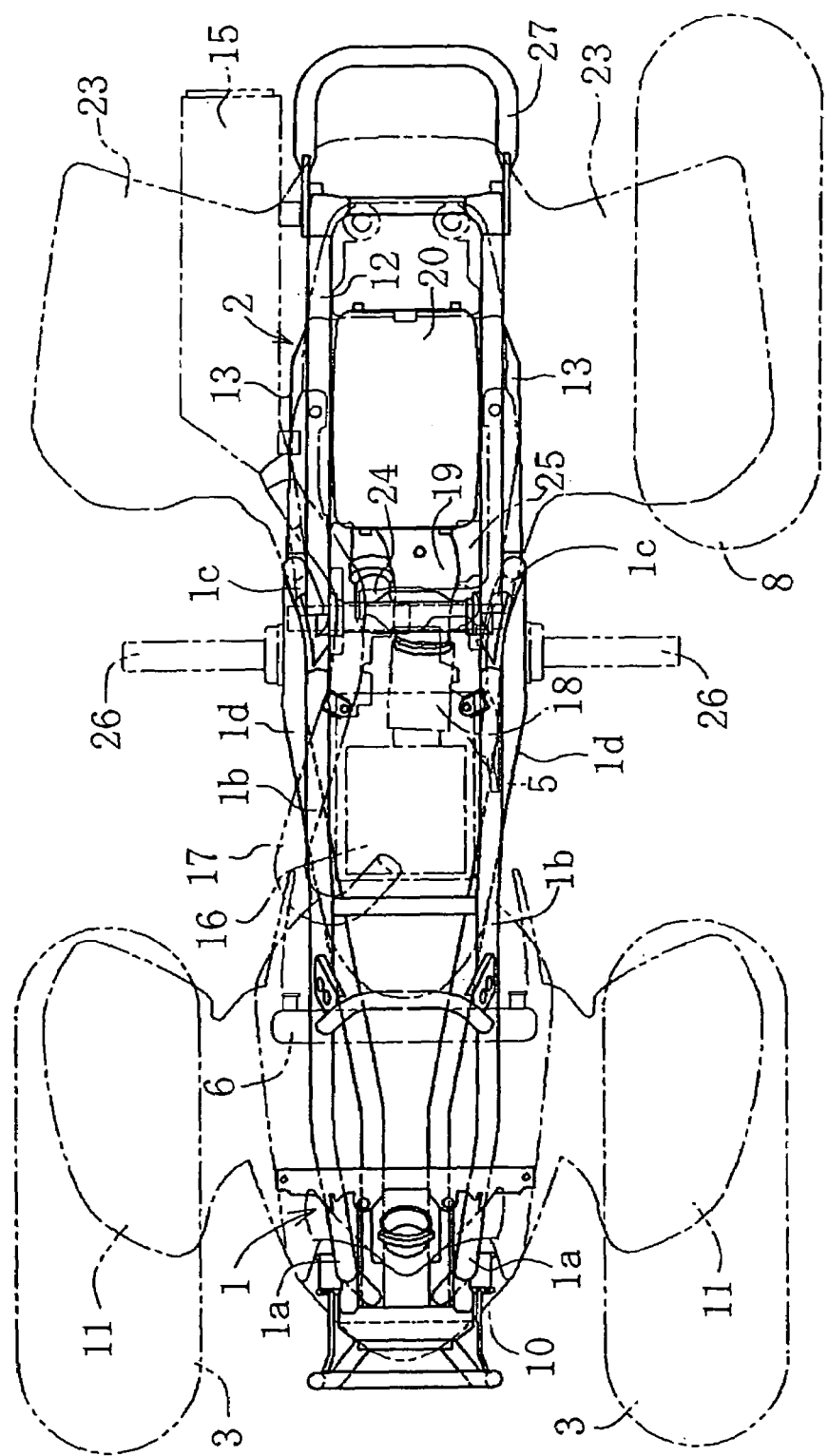
FIG. 2 is a diagrammatic view of an essential part of the vehicle body structure of the four-wheel buggy car.

FIG. 2 is a diagrammatic view of an essential part of the vehicle body structure of the four-wheel buggy car, in which the main frame 1 and the rear frames 2 are each composed of a left-right pair of pipe members. As is clear from the figure, the air cleaner 20 is contained between the left and right rear frames 2. Symbol 24 denotes an intake duct, which extends forwards from a front surface of the air cleaner 20, and is opened to a lateral side. Besides, the opening position of the intake duct 24 is located on the upper side of an upper surface of the connecting tube 19 and on the lower side of a dust cover 25.

The dust cover 25 covers the upper side of each of the connecting tube 19 and the intake duct 24 to the front end of the upper surface of the air cleaner 20, and is mounted to the left and right upper pipes 1b and seat rails 12. The spaces on the upper side of the air cleaner 20 and the dust cover 25 constitute intake passages, for introducing the outside air from the upper lateral side of the air cleaner 20 in the rear fender 23 and leading the air to the intake duct 24. Symbol 26 denotes step bars, and 27 denotes a rear carrier.

Figure 3:
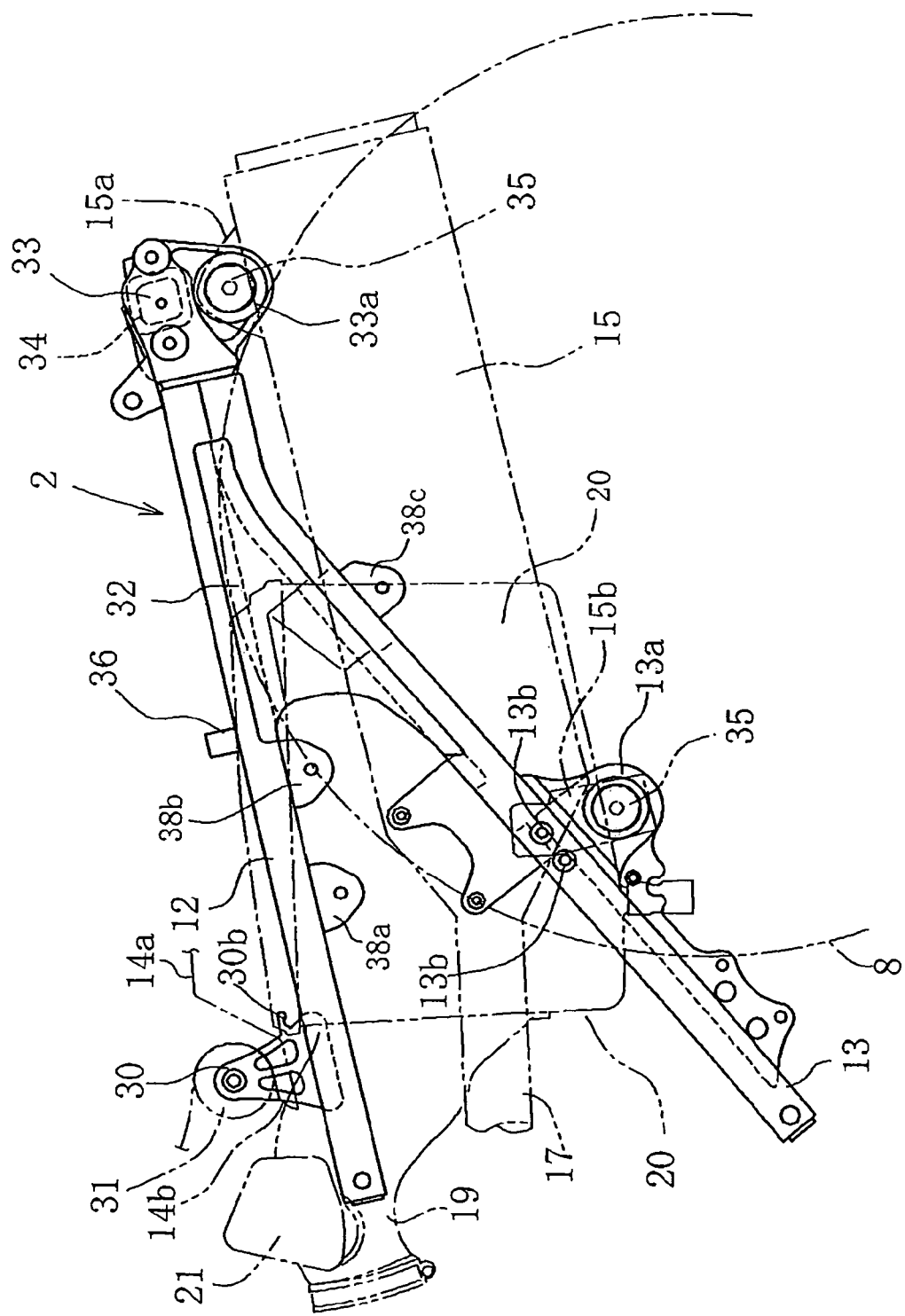
FIG. 3 is a side view of a rear frame.

FIG. 3 is a side view of the rear frame 2, in which a damper bracket 30 is welded to a portion, near a front end portion, of the seat rail 12, and a rubber damper 31 is mounted to an upper end portion of the damper bracket 30. A hook 14b provided on a lower surface of a bottom plate 14a of the seat 14 is engaged with the rubber damper 31. The hook 14b is of a known structure in which the hook 14b includes a portion projecting forwards and the rubber damper 31 is fitted between this portion and the seat bottom plate.

The seat rail 12 and the rear stay 13 overlap each other on the upper and lower sides at an acute angle at a rear portion of the rear frame 2, are integrated with each other by welding, and are reinforced by a gusset 32. Carrier brackets 33 are welded to rear end portions of the left and right rear frames 2, front end portions of the rear carrier 27 are bolted to the carrier brackets 33 (see FIG. 2), and a cross pipe 34 is supported between the left and right carrier brackets 33.

In addition, the carrier bracket 33 on the right side of the vehicle body is provided with a bush mount portion 33a, to which a bush 35 is attached by fitting, and a stay 15a projectingly formed on an upper surface of a rear end portion of the muffler 15 is bolted, to thereby support the muffler 15 in a vibrationproofing manner. The rear stay 13 on the right side of the vehicle body is also provided with a similar bush mount portion 13a on the front end portion side, and a bush 35 fitted to the bush mount portion 13a supports a front end portion of the muffler 15 in a vibrationproofing manner. Symbol 15b denotes a stay provided on the front end portion side of the muffler 15. Symbols 38a, 38b, and 38c denote mount stays for the air cleaner 20.

Figure 4:
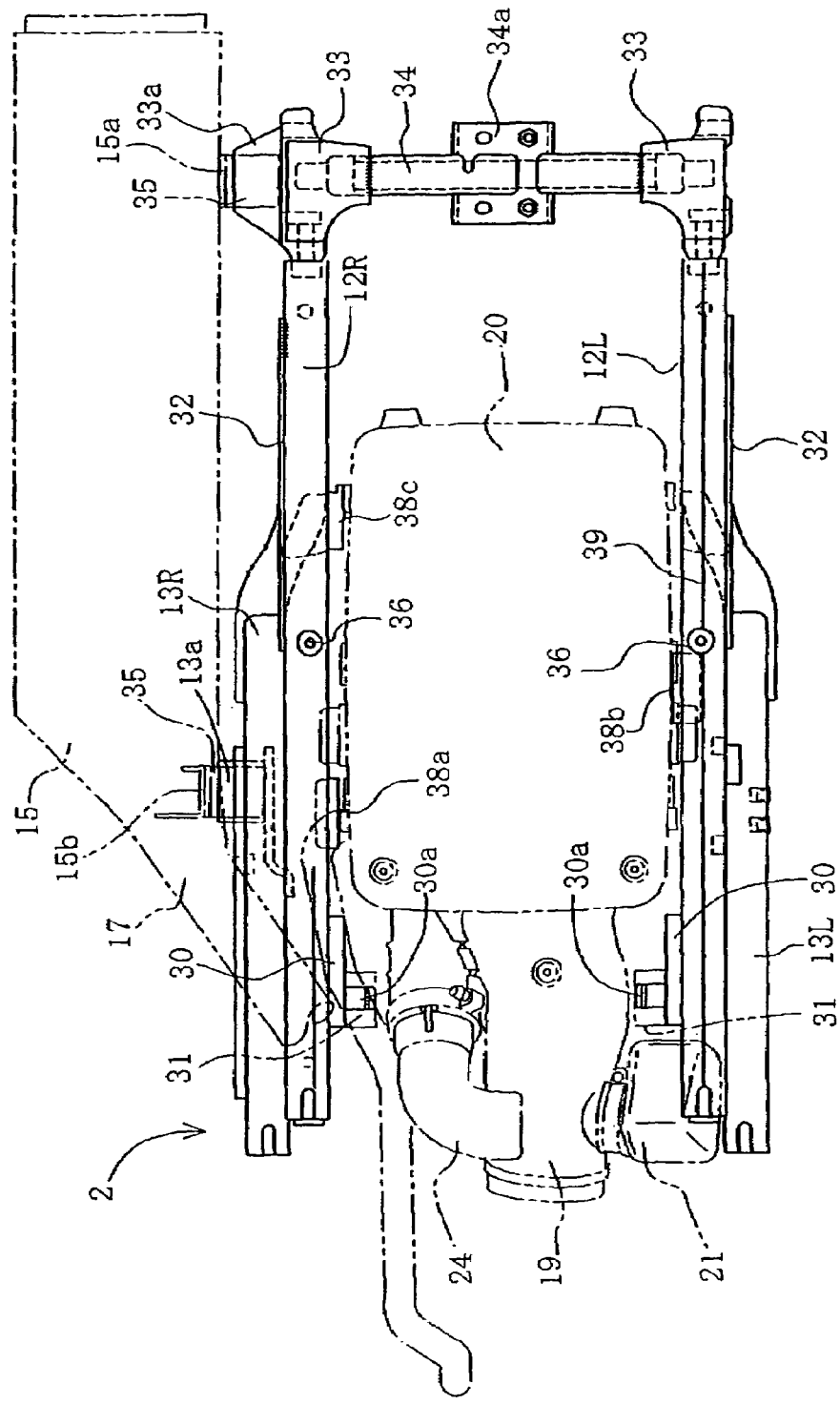
FIG. 4 is a diagrammatic view of the rear frames.

FIG. 4 is a diagrammatic view of the rear frames 2. Incidentally, in the following description, of the left and right seat rails 12, the one on the vehicle body right side will be denoted by 12R, while the one on the vehicle body left side will be denoted 12L, as required; similarly, of the rear stays 13, the one on the vehicle body right side will be denoted by 13R, while the one on the vehicle body left side will be denoted by 13L.

The seat rails 12R and 12L and the rear stays 13R and 13L are provided in left-right pairs, and the width between the rear stays 13R and 13L is greater than the width between the seat rails 12R and 12L.

The left and right damper brackets 30 are provided at upper end portions thereof with support shafts 30a projecting into the inside of the vehicle body, and the rubber dampers 31 are attached to the support shafts 30a. The rubber dampers 31 are engaged with the hooks 14b (FIG. 3) provided on the bottom plate of the seat 14, whereby a front portion of the seat 14 is supported in a vibrationproofing manner. Symbol 36 denotes mount bosses for the rear fender 23, which are offset in a vertical direction from intermediate portions, in the front-rear direction, of the left and right seat rails 12. Symbol 34a denotes a support plate for a seat lock for a rear end portion of the seat 14.

As is clear from this figure, the muffler 15 which is a heavy body is disposed only on the vehicle body right side, so that the seat rail 12R on the vehicle body right side is provided with the bush mount portion 33a and the rear stay 13R on the vehicle body right side is provided with the bush mount portion 13a.

Figure 5:
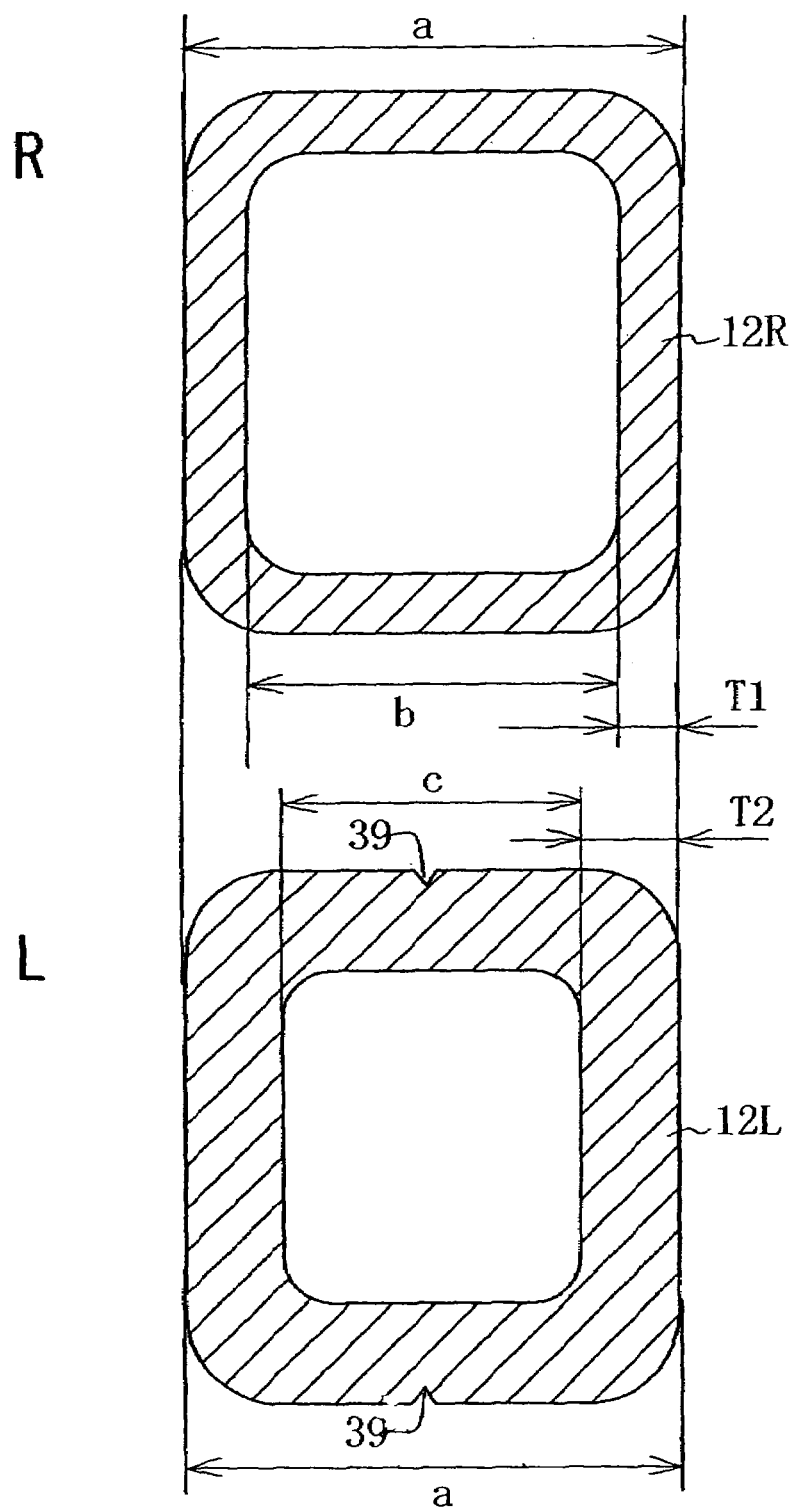
FIG. 5 is a cross sectional view showing left and right seat rails.

FIG. 5 shows cross sectional view of left and right seat rails, in which R shows the section of the seat rail 12R on the vehicle body right side, and L shows the section of the seat rail 12L on the vehicle body left side. Incidentally, the same applies also to the rear stays 13, and, therefore, description will be made of the seat rails 12. As is clear from this figure, the left and right seat rails 12L and 12R are both formed in the shape of angular pipes, and the outside sizes are equal.

On the other hand, the inside sizes b and c of the right and left seat rails 12R and 12L are different. In this case, the inside size b of the seat rail 12R on the vehicle body right side where the muffler 15 as a heavy body is supported is greater than the inside size c of the seat rail 12L on the vehicle body left side where the muffler 15 is not supported (b>c).

In other words, the plate thickness T1 of the seat rail 12R on the vehicle body right side where the muffler 15 as a heavy body is supported is smaller than the plate thickness T2 of the seat rail 12L on the vehicle body left side where the muffler 15 is not supported (T1<T2). With the larger plate thickness T2, the seat rail 12L on the vehicle body left side is increased in overall weight as compared with that on the right side, resulting in a difference in vibration mode.

In view of this, by regulating the plate thickness T2 relative to the plate thickness T1, a weight regulation is conducted so that the vibration mode in the seat rail 12L on the vehicle body left side where the heavy body is not supported is the same as or approximate to the vibration mode in the seat rail 12R on the vehicle body right side where the muffler 15 as a heavy body is supported. The plate thicknesses T1 and T2 can be arbitrarily regulated, preferably in the range of 1.8 to 6.0 mm, while maintaining the above-mentioned relationship T1<T2. A preferable example can be set in which the ratio between the plate thicknesses T1 and T2 is T1:T2=1:1.25, and the plate thickness T1 is 2.0 mm, while the plate thickness T2 is 2.5 mm.

Besides, the seat rail 12L on the vehicle body left side is provided in its upper and lower surfaces with identification marks 39 as mis-assembly preventive indicator. The identification marks 39 are straight grooves formed along the longitudinal direction of the seat rail 12L, and where the seat rail 12L is produced by extrusion of a light alloy, the identification marks 39 are formed simultaneously with the extrusion by a die. Incidentally, the positions of the identification marks 39 are not particularly limited but are located at any positions in the left-right direction and the like, insofar as the identification marks 39 are easily visible. Besides, the identification marks 39 may be provided in either one of the left and right seat rails.

Functions of the present embodiment will be described below. As shown in FIG. 4, only the seat rail 12R on one side, of the left and right seat rails 12R and 12L, supports the muffler 15 as a heavy body, while the seat rail 12L on the other side does not support a heavy body, so that the weight supported on the seat rail 12R and the weight supported on the seat rail 12L are different (non-uniform).

Therefore, while the use of the same pipe-like member on the left and right sides leads to different vibration modes of the left and right pipes and possibly to the local generation of large resonance at the pipe on one side, the seat rail 12R and the seat rail 12L in this embodiment differ from each other in plate thickness and hence in weight; specifically, since the plate thickness T2 of the seat rail 12L on the side where the muffler 15 as a heavy body is not supported is greater than the plate thickness T1 of the seat rail 12R on the side where a heavy body is supported, the weight of the seat rail 12L is greater. As a result, though the weight supported on the right seat rail 12R is different from the weight supported on the left seat rail 12L, the vibration modes in the right and left seat rails 12R and 12L can be regulated to be equal to or similar to each other, whereby the generation of local resonance at either one of the left and right pipes can be prevented or suppressed.

In addition, since the outside size a is common for both the right and left seat rails 12R and 12L notwithstanding the difference in plate thickness between the right and left sides, the diametric size or the like on an outside shape basis is constant, and good appearance quality can be maintained. Moreover, the constant diametric size allows the use of common component parts and the like on the left and right sides, thereby enhancing the assembly process.

In addition, since the seat rail 12L is provided with the identification marks 39 as mis-assembly preventive indicator, the right and left seat rails 12R and 12L differing in plate thickness can be discriminated from each other through quick visual checking. Therefore, the right and left seat rails 12R and 12L which are not considerably different in appearance can be mounted by discriminating them from each other easily and accurately, whereby mis-assembly on the left and right sides can be prevented, so that the assembly process is further enhanced.

Incidentally, the present invention is not limited to the above-described embodiment, and various applications and modifications are possible. For example, the heavy body supported by the rear frame may not necessarily be the muffler but may be a battery or a like component part. Besides, the hollow members differing in material thickness between the left and right sides may be the rear stays 13, or may be both the seat rails 12 and the rear stays 13. Specifically, in the above-described embodiment, the hollow members may be used to constitute the entire body or an arbitrary part of each of the left and right rear frames 2. Alternatively, the hollow members may be used on the side of the vehicle body frame 1 on the front side of the rear frames 2.

The hollow members are not limited to angular pipes but may be any of hollow members such as round pipes, channel members opened at a part of side surface, etc.; the method of producing the hollow members is not limited to extrusion, and various known methods can be utilized for the production.

Furthermore, the mis-assembly preventive indicator is not limited to the identification marks 39, and there can be used stamping of scattered points, indication by a paint or the like, etc. In some cases, small projections serving as marks or the like may be adhered. It should be noted here that in the case of the embodiment, the identification marks 39 can be formed simultaneously with the formation of the pipe-like members by extrusion using a light alloy, which enables advantageous formation of the mis-assembly preventive indicator.

In the above description, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention claimed is:

1. A frame structure for a vehicle body frame, comprising:
   first and second hollow members; and
   a heavy body supported on a side of said first hollow member,
   wherein a plate thickness of said second hollow member is greater than a plate thickness of said first hollow members,
   wherein said first and second hollow members are seat rails for supporting a vehicle seat.

2. The frame structure for a vehicle body frame according to claim 1, wherein said first and second hollow members support a vehicle seat, and said first and second hollow members comprise angular pipes disposed one on a vehicle body right side and one on a vehicle body left side.

3. The frame structure for a vehicle body frame according to claim 1, wherein said heavy body is one of an exhaust muffler and a battery.

4. The frame structure for a vehicle body frame according to claim 1, wherein a ratio of the plate thickness of said first hollow member to that of said second hollow member is 1:1.25.

5. The frame structure for a vehicle body frame according to claim 1, wherein outside diameter of said first and second hollow members is substantially the same.

6. The frame structure for a vehicle body frame according to claim 1, wherein said first hollow member is positioned on a right side of the vehicle body frame.

7. The frame structure for a vehicle body frame according to claim 1, farther comprising:
   a mis-assembly preventive indicator for discriminating said first and second hollow members.

8. The frame structure for a vehicle body frame according to claim 7, wherein said mis-assembly preventive indicator is a groove.

9. The frame structure for a vehicle body frame according to claim 8, wherein the groove is formed along the longitudinal direction of the seat rail.

10. The frame structure for a vehicle body frame according to claim 7, wherein said mis-assembly preventive indicator is any one of a stamping of scattered points, a paint mark, and a small projection.

11. A frame structure for a body frame of a saddle riding type of vehicle, comprising:
    a first seat rail, positioned on a right side of the body frame, supporting a heavy body; and
    a second seat rail, positioned on a left side of the body frame, having a greater plate thickness than said first seat rail.

12. A frame structure for a body frame of a saddle riding type of vehicle according to claim 11, further comprising:
    a mis-assembly preventive indicator positioned on either said first seat rail or said second seat rail.

13. A frame structure for a body frame of a saddle riding type of vehicle according to claim 11, wherein said indicator is a groove.

14. A method for reducing vibration on a vehicle body frame, comprising the steps of:
    regulating a plate thickness of a first hollow member and a second hollow member,
    discriminating said first hollow member from said second hollow member, and
    selectively attaching a heavy body to said first hollow member, wherein said first hollow member has a larger internal diameter than said second hollow member;
    wherein said first and second hollow members are seat rails for supporting a vehicle seat.

15. A method for reducing vibration on a vehicle body frame as set forth in claim 14, further comprising regulating the plate thickness of said first hollow member and said second hollow member such that said first hollow member has a smaller plate thickness than said second hollow member.

16. A method for reducing vibration on a vehicle body frame as set forth in claim 14, wherein the weight of said first hollow member is less than the weight of said second hollow member.

17. A method for reducing vibration on a vehicle body frame as set forth in claim 14, further comprising discriminating said first hollow member from said second hollow member according to a mis-assembly preventive indicator.

* * * * *